US007085535B2

(12) United States Patent
Goto et al.

(10) Patent No.: US 7,085,535 B2
(45) Date of Patent: Aug. 1, 2006

(54) RADIO COMMUNICATION DEVICE FOR AVOIDING FREQUENCY COLLISION AMONG DIFFERENT RADIO CONTROL SCHEMES

(75) Inventors: Masataka Goto, Kanagawa (JP); Masahiro Takagi, Tokyo (JP); Naoki Esaka, Kanagawa (JP); Atsushi Inoue, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 784 days.

(21) Appl. No.: 10/108,504

(22) Filed: Mar. 29, 2002

(65) Prior Publication Data

US 2002/0142779 A1 Oct. 3, 2002

(30) Foreign Application Priority Data

Mar. 29, 2001 (JP) ........................ 2001-095978

(51) Int. Cl.
H04B 1/00 (2006.01)
H04B 1/69 (2006.01)
H04L 12/413 (2006.01)
H04J 3/24 (2006.01)
H04Q 7/24 (2006.01)

(52) U.S. Cl. ............... 455/63.1; 370/446; 370/349; 370/338; 375/133

(58) Field of Classification Search ............ 455/63.1, 455/63.4, 67.11, 67.15, 450, 550, 464, 119; 370/133, 380, 85.2, 85.3, 349, 446, 343, 370/345, 255, 252, 448
See application file for complete search history.

(56) References Cited

U.S. PATENT DOCUMENTS

| | | | | |
|---|---|---|---|---|
| 4,063,220 A | * | 12/1977 | Metcalfe et al. | 340/825.5 |
| 4,412,326 A | * | 10/1983 | Limb | 370/448 |
| 5,390,181 A | * | 2/1995 | Campbell et al. | 370/444 |
| 5,574,979 A | * | 11/1996 | West | 455/63.1 |
| 5,732,077 A | * | 3/1998 | Whitehead | 370/349 |
| 5,870,385 A | * | 2/1999 | Ahmadi et al. | 370/252 |
| 5,884,171 A | * | 3/1999 | Tanabe et al. | 455/434 |
| 5,936,962 A | * | 8/1999 | Haddock et al. | 370/446 |
| 6,310,872 B1 | * | 10/2001 | Almgren et al. | 370/349 |
| 6,473,414 B1 | * | 10/2002 | Hartley et al. | 370/338 |
| 6,614,768 B1 | * | 9/2003 | Mahany et al. | 370/328 |
| 6,728,294 B1 | * | 4/2004 | Kohno et al. | 375/133 |
| 2002/0075941 A1 | * | 6/2002 | Souissi et al. | 375/133 |
| 2002/0085622 A1 | * | 7/2002 | Dhar et al. | 375/132 |
| 2002/0136183 A1 | * | 9/2002 | Chen et al. | 370/338 |

FOREIGN PATENT DOCUMENTS

JP 2000-261244 9/2000
JP 2001-69060 3/2001

OTHER PUBLICATIONS

Jim Lansford, PH.D., et al., "Wi–Fi™ (802.11b) and Bluetooth Simultaneous Operation: Characterizing the Problem", White Paper of Mobilian, Sep. 2000, pp. 1–14.
Mobilian Corporation, "Wi–Fi™ (802.11b) and Bluetooth™: An Examination of Coexistence Approaches", White Paper of Mobilian, Jan. 2001, pp. 1–25.

* cited by examiner

*Primary Examiner*—William Trost
*Assistant Examiner*—Kiet Doan
(74) *Attorney, Agent, or Firm*—Oblon, Spivak, McClelland, Maier & Neustadt, P.C.

(57) ABSTRACT

A radio communication device is provided with a unit for acquiring a prediction information for a frequency, time or direction to be used by each one of the first radio control scheme of the radio communication device and a second radio control scheme of another surrounding radio communication device, and a unit for obtaining a predicted frequency, time or direction for which interferences between radio communications by the first radio control scheme and radio communications by the second radio control scheme are predicted to occur according to the prediction information, and control the radio communication unit to carry out radio communications by avoiding the predicted frequency, time or direction.

9 Claims, 12 Drawing Sheets

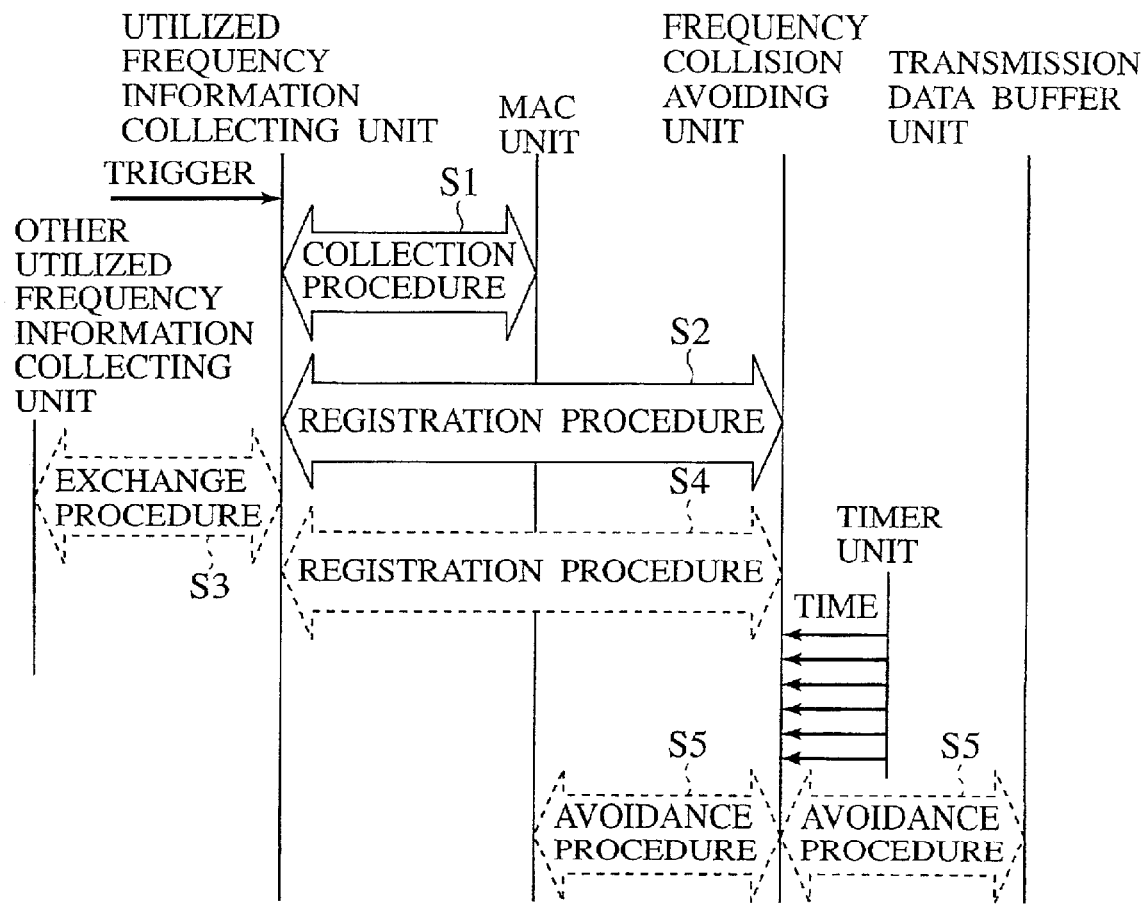
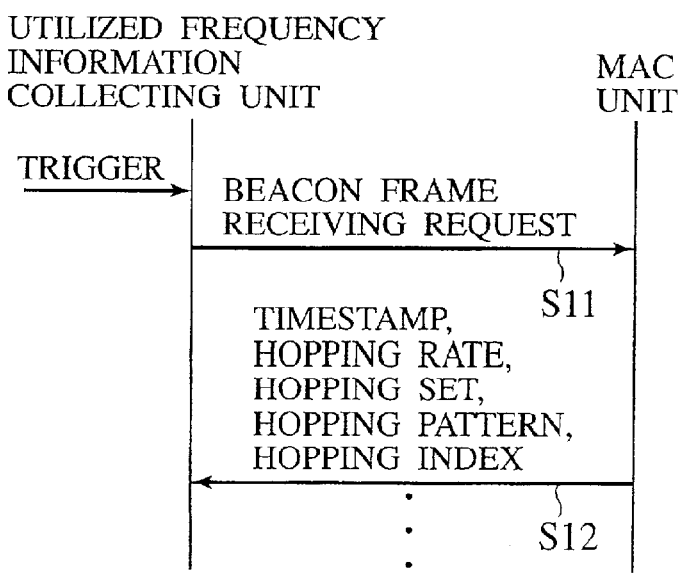

FIG.5

| i | b(i) | i | b(i) | i | b(i) | i | b(i) | i | b(i) | i | b(i) | i | b(i) | i | b(i) |
|---|---|---|---|---|---|---|---|---|---|---|---|---|---|---|---|
| 1 | 0 | 11 | 76 | 21 | 18 | 31 | 34 | 41 | 14 | 51 | 20 | 61 | 48 | 71 | 55 |
| 2 | 23 | 12 | 29 | 22 | 11 | 32 | 66 | 42 | 57 | 52 | 73 | 62 | 15 | 72 | 35 |
| 3 | 62 | 13 | 59 | 23 | 36 | 33 | 7 | 43 | 41 | 53 | 64 | 63 | 5 | 73 | 53 |
| 4 | 8 | 14 | 22 | 24 | 71 | 34 | 68 | 44 | 74 | 54 | 39 | 64 | 17 | 74 | 24 |
| 5 | 43 | 15 | 52 | 25 | 54 | 35 | 75 | 45 | 32 | 55 | 13 | 65 | 6 | 75 | 44 |
| 6 | 16 | 16 | 63 | 26 | 69 | 36 | 4 | 46 | 70 | 56 | 33 | 66 | 67 | 76 | 51 |
| 7 | 71 | 17 | 26 | 27 | 21 | 37 | 60 | 47 | 9 | 57 | 65 | 67 | 49 | 77 | 38 |
| 8 | 47 | 18 | 77 | 28 | 3 | 38 | 27 | 48 | 58 | 58 | 50 | 68 | 40 | 78 | 30 |
| 9 | 19 | 19 | 31 | 29 | 37 | 39 | 12 | 49 | 78 | 59 | 56 | 69 | 1 | 79 | 46 |
| 10 | 61 | 20 | 2 | 30 | 10 | 40 | 25 | 50 | 45 | 60 | 42 | 70 | 28 | - | - |

RADIO COMMUNICATION DEVICE FOR AVOIDING FREQUENCY COLLISION AMONG DIFFERENT RADIO CONTROL SCHEMES

BACKGROUND OF THE INVENTION

1. Field of the Invention

The present invention relates to a radio communication device and a radio communication control method for enabling the suppression of a performance degradation due to radio wave interferences under the environment in which radio communication devices of various schemes are coexisting in the same frequency band.

2. Description of the Related Art

In recent years, radio devices are rapidly spreading as devices for the computer network, because a radio device can be used without any license once it is approved as a specific small power radio station using 2.4 GHz band called ISM (Industry Science Medical) band.

In particular, radio LAN devices compatible with the IEEE 802.11 are widely spreading. In the IEEE 802.11, both a direct spreading (DS) scheme and a frequency hopping (FH) scheme are specified as the standard spectrum spreading techniques for the physical layer specification. On the other hand, the Bluetooth devices are beginning to be widely spread as radio devices of another scheme that uses the ISM band.

However, there is no compatibility between the DS scheme and the FH scheme in the IEEE 802.11, and there is also no compatibility between the IEEE 802.11 and the Bluetooth. For this reason, when radio devices of different schemes using the same frequency coexist, they can be radio wave interference sources to each other and cause the degradation of the communication rate performance.

Also, the operations such as the re-transmission in the case where the transmitted frame fails to reach the transmission destination or the transmission delay due to the carrier sense, which are originally intended for the purpose of cooperating a plurality of radio devices, can actually cause a considerable level of the degradation of the communication rate performance or the damaging of the fairness in the communication performance among the radio devices under the environment in which different schemes are coexisting.

BRIEF SUMMARY OF THE INVENTION

It is therefore an object of the present invention to provide a radio communication device and a radio communication control method capable of preventing the unnecessary degradation of the communication rate performance and maintaining the fairness in the communication performance among different radio communication schemes even under the environment in which radio communication devices of various schemes using the same frequency band are coexisting.

According to one aspect of the present invention there is provided a radio communication device, comprising: a radio communication unit configured to carry out radio communications by a first radio control scheme; an acquisition unit configured to acquire a prediction information for at least one of a frequency, a time and a direction to be used by each one of the first radio control scheme of the radio communication device and a second radio control scheme of another radio communication device located within a communication possible range of the radio communication device; and a collision avoiding unit configured to obtain a predicted frequency, a predicted time or a predicted direction for which interferences between radio communications by the first radio control scheme and radio communications by the second radio control scheme are predicted to occur according to the prediction information, and control the radio communication unit to carry out radio communications by avoiding the predicted frequency, the predicted time or the predicted direction.

According to another aspect of the present invention there is provided a radio communication control method for a radio communication device having a radio communication unit configured to carry out radio communications by a first radio control scheme, the method comprising: acquiring a prediction information for at least one of a frequency, a time and a direction to be used by each one of the first radio control scheme of the radio communication device and a second radio control scheme of another radio communication device located within a communication possible range of the radio communication device; obtaining a predicted frequency, a predicted time or a predicted direction for which interferences between radio communications by the first radio control scheme and radio communications by the second radio control scheme are predicted to occur according to the prediction information; and controlling the radio communication unit to carry out radio communications by avoiding the predicted frequency, the predicted time or the predicted direction.

According to another aspect of the present invention there is provided a computer program product for causing a computer to function as a radio communication device having a radio communication unit configured to carry out radio communications by a first radio control scheme, the computer program product comprising: a first computer program code for causing the computer to acquire a prediction information for at least one of a frequency, a time and a direction to be used by each one of the first radio control scheme of the radio communication device and a second radio control scheme of another radio communication device located within a communication possible range of the radio communication device; a second computer program code for causing the computer to obtain a predicted frequency, a predicted time or a predicted direction for which interferences between radio communications by the first radio control scheme and radio communications by the second radio control scheme are predicted to occur according to the prediction information; and a third computer program code for causing the computer to control the radio communication unit to carry out radio communications by avoiding the predicted frequency, the predicted time or the predicted direction.

Other features and advantages of the present invention will become apparent from the following description taken in conjunction with the accompanying drawings.

BRIEF DESCRIPTION OF THE DRAWINGS

FIG. 3 is a sequence chart showing an exemplary processing sequence of the radio communication device of FIG. 1.

FIG. 4 is a sequence chart showing one exemplary collection sequence of the radio communication device of FIG. 1.

FIG. 5 is a diagram showing a hopping sequence for a frequency hopping scheme of IEEE 802.11 that can be used in the radio communication device of FIG. 1.

DETAILED DESCRIPTION OF THE INVENTION

Referring now to FIG. 1 to FIG. 21, one embodiment of a radio communication device and a radio communication control method according to the present invention will be described in detail.

Figure 1:
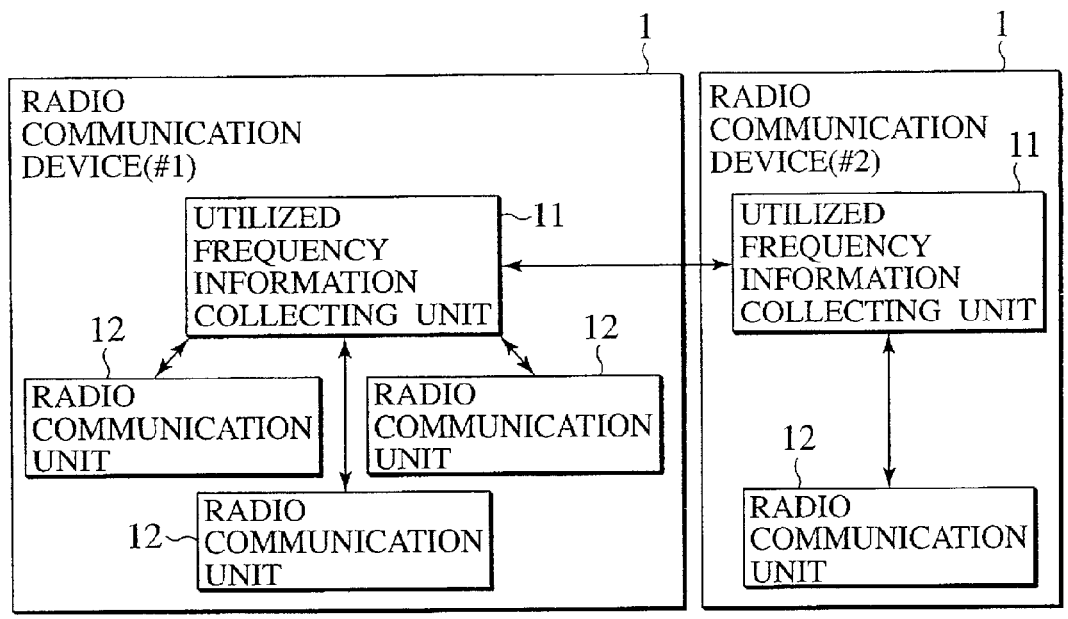
FIG. 1 is a block diagram showing an exemplary configuration of a radio communication device according to one embodiment of the present invention.

FIG. 1 shows an exemplary configuration of a radio communication device in this embodiment. Note that FIG. 1 mainly shows only those portions that are related to the present invention.

Figure 2:
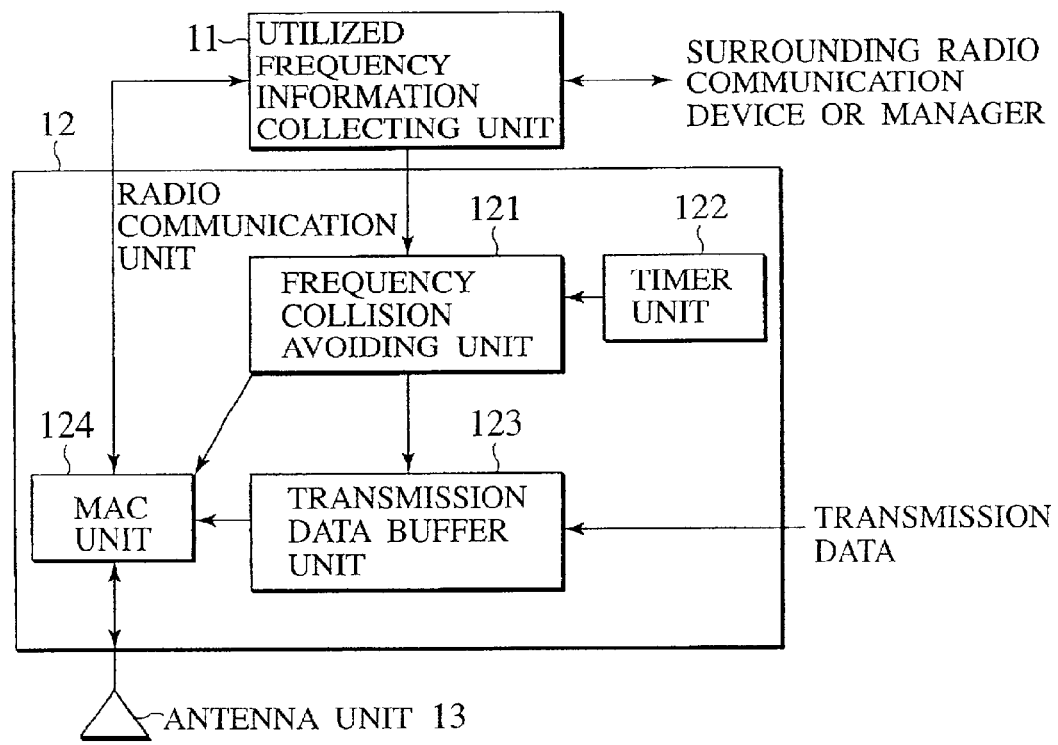
FIG. 2 is a block diagram showing one exemplary configuration of a radio communication unit in the radio communication device of FIG. 1.

As shown in FIG. 1, the radio communication device 1 of this embodiment comprises a utilized frequency information collecting unit 11, a radio communication units 12 provided in correspondence to one or a plurality of radio control schemes to be used by this radio communication device, and an antenna 13 (not shown in FIG. 1, but shown in FIG. 2).

The radio communication device (#1) of FIG. 1 is an example in which three radio communication units 12 are provided in correspondence to three types of the radio control schemes, while the radio communication device (#2) of FIG. 1 is an example in which one radio communication unit 12 is provided in correspondence to one type of the radio control scheme. The radio communication device 1 of this embodiment can be provided with an arbitrary number of the radio communication units 12 in correspondence to an arbitrary number of the radio control schemes.

Regardless of the radio control schemes to be adopted, the radio communication device 1 of this embodiment has the utilized frequency information collecting unit 11. This utilized frequency information collecting unit 11 collects information necessary in predicting the frequency to be used by this radio communication device 1 and the time of its use, and provides the collected information or information predicted according to the collected information to another radio communication device, so as to enable the another radio communication device to avoid the adverse influence due to the frequency collision with this radio communication device 1. Similarly, this radio communication device 1 is enabled to avoid the adverse influence due to the frequency collision with the another radio communication device by receiving the similar information from the another radio communication device.

Also, the utilized frequency information collecting unit 11 carries out exchanges of the collected information or information predicted according to the collected information, with the utilized frequency information collecting unit 11 of the surrounding radio communication devices, so as to realize the above described effect in the wider range.

Each radio communication unit 12 is basically formed by a physical layer and a MAC (Media Access Control) layer for realizing the communication functions, regardless of the radio control scheme to be adopted. Here, it is assumed that the existing radio LAN product module can be used as the radio communication unit 12. The radio communication unit 12 may be capable of data transmission/reception, or may be specialized for the reception of data outputted by the surrounding radio communication devices. Namely, as will be described below, it is possible to use a device that only has the reception function for the purpose of collecting information necessary in predicting the frequencies to be used by the surrounding radio communication devices.

In the following, the operations of the utilized frequency information collecting unit 11 will be described in terms of a procedure for collecting the information necessary in predicting the frequency to be used by each radio communication unit and the time of its use from each radio communication unit for each radio control scheme of this radio communication device, a procedure for predicting the frequency to be used and the time of its use according to the collected information, a procedure for exchanging the predicted information with the other radio communication devices, and a procedure for avoiding the frequency collision according to the prediction. In the following description, the radio communication unit is assumed to be a radio LAN module capable of data transmission/reception.

FIG. 2 shows an exemplary configuration of the radio communication unit 12 in this embodiment. Note that FIG. 2 mainly shows only those portions that are related to the present invention. Also, in FIG. 2, the connection relationship of the radio communication unit 12 with the utilized frequency information collecting unit 11 and the antenna 13 is shown for one radio communication unit 12.

The radio communication unit 12 is assumed to have basically the same configuration regardless of the radio control scheme to be adopted.

As shown in FIG. 2, each radio communication unit 12 comprises a frequency collision avoiding unit 121, a timer unit 122, a transmission data buffer unit 123, and a MAC unit 124.

First, each constituent element will be described briefly. The further detail of each constituent element will be described in relation to the processing procedures to be described below.

The utilized frequency information collecting unit 11 receives the input of "timestamp, hopping rate, hopping set, hopping pattern, and hopping index of FH" or "channel of DS" or "master clock offset and master BD_ADDR of Bluetooth" according to the transmission scheme of the physical layer, and predicts and maintains a frequency to be occupied and its time corresponding to that input. The utilized frequency information collecting unit 11 also carries out the registration of the maintained prediction into the frequency collision avoiding unit 121 and the exchange of the predicted result with the utilized frequency information collecting unit 11 of the other radio communication devices.

The frequency collision avoiding unit 121 of the radio communication unit 12 makes a channel change request or an antenna specification to the MAC unit 124, or a buffer start/end request to the transmission data buffer unit 123, according to the information on the frequency to be occupied and its time registered from the utilized frequency information collecting unit 11 and the time information from the timer unit 122.

The transmission data buffer unit 123 of the radio communication unit 12 normally transfers the transmission data entered from the external to an appropriate output target. On the other hand, when the buffer start request from the frequency collision avoiding unit 121 is received, the transmission data buffer unit 123 buffers or discards the entered transmission data internally, and at a timing of the buffer end request, the transmission data buffer unit 123 carries out the normal procedure after outputting any remaining transmission data that are buffered internally.

The MAC unit 124 is assumed to be maintaining the information on the frequency to be used. It is also assumed that the change of the parameters dependent on the frequency or the radio communication scheme to be used can be realized by giving a command to the MAC unit 124. Note that, in the case (of the radio unit, for example) where a portion for maintaining the information on the frequency to be used or a portion to be given a command in order to change the parameters dependent on the frequency or the radio communication scheme to be used is different depending on the radio communication unit 12, it suffices to give a suitable command to an appropriate portion (the radio unit, for example).

Next, the processing of the radio communication device 1 of this embodiment will be described.

FIG. 3 shows an exemplary processing sequence of the radio communication device 1 of this embodiment.

At a time of the activation of the radio communication device 1 or a trigger given from the external, a procedure for collecting the information regarding the frequency to be utilized by the radio communication unit 12 of the radio communication device 1 itself is started (step S1), the frequency to be used is predicted, and the registration of the predicted result is carried out (step S2).

Also, a procedure for collecting the information regarding the frequency to be utilized by the radio communication unit 12 of the surrounding radio communication device is started (step S3), the frequency to be used by the radio communication unit 12 of the surrounding radio communication device is predicted, and the registration of the predicted result is carried out (step S4).

Note that either one of the collection, prediction and registration regarding this radio communication device itself and the collection, prediction and registration regarding the surrounding radio communication device can be carried out earlier than the other, or both of these can be carried out in parallel. Note also that the collection, prediction and registration can be repeated according to the need.

Then, at a prescribed timing, the avoidance of the radio wave interference is carried out (step S5) by the method such as the postponing of the data transmission, the shortening of the transmission frame, the interruption of the data transmission/reception, the use of the modulation with a superior radio wave interference tolerance, the selection of the transmission/reception direction, the avoidance of the use of the colliding frequency, etc.

In the following, each procedure will be described in further detail.

First, the collection, prediction and registration will be described. Note that a procedure for the own device and a procedure for the surrounding device are basically the same except for the presence or absence of the occurrence of the communications between devices, so that a procedure for the surrounding device will be mainly described here.

The collection procedure can be one that depends on the radio communication scheme to be used by the radio communication unit 12 or one that does not depend on the radio communication scheme.

First, the procedure depending on the radio communication scheme will be described for each radio communication scheme.

(Frequency Hopping of IEEE 802.11)

The collection procedure in the case of the frequency hopping scheme of the IEEE 802.11 or similar schemes will be described.

FIG. 4 shows an exemplary collection sequence in this case.

The utilized frequency information collecting unit 11 requests the MAC unit 124 of the radio communication unit 12 to receive a beacon frame used by the radio communication unit 12 of the surrounding radio communication device (step S11). Here, the manner of requesting can be dependent on the implementation of the MAC unit 124.

When the beacon frame is received, the MAC unit 124 gives the information on timestamp, hopping rate, hopping set, hopping pattern, and hopping index described within the beacon frame to the utilized frequency information collecting unit 11 along with the MAC address (step S12).

At the utilized frequency information collecting unit 11, the frequency to be used by the radio communication unit 12 of the surrounding radio communication device that has transmitted the beacon frame can be predicted by the following method according to the received information on timestamp, hopping rate, hopping set, hopping pattern, and hopping index, Namely, in the frequency hopping scheme of the IEEE 802.11, the frequency is sequentially hopped by the hopping sequence shown in FIG. 5 according to the following hopping patterns.

$x_1(n)=\{0, 3, 6, 9, 12, 15, 18, 21, 24, 27, 30, 33, 36, 39, 42, 45, 48, 51, 54, 57, 60, 63, 66, 69, 72, 75\}$ Set 1

$x_2(n)=\{1, 4, 7, 10, 13, 16, 19, 22, 25, 28, 31, 34, 37, 40, 43, 46, 49, 52, 55, 58, 61, 64, 67, 70, 73, 76\}$ Set 2

$x_2(n)=\{2, 5, 8, 11, 14, 17, 20, 23, 26, 29, 32, 35, 38, 41, 44, 47, 50, 53, 56, 59, 62, 65, 68, 71, 74, 77\}$ Set 3

Consequently, denoting the timestamp as Ts, the hopping rate as p, the hopping set as s, the hopping pattern of the hopping set s as $x_s$ and the hopping index as i, the frequency to be used F(t) MHz at the time t (which should be later than the timestamp so that Ts≧t) can be predicted by the following equations.

$F(t)=ch(i)+2400$ $ch(i)=[b(I(t))+x_s(N(t))]\mathrm{mod}(79)+2$ $I(t)=(i+(t-Ts)/p)\mathrm{mod}(80)$ $N(t)=(J((t-Ts)/(80 \cdot p))+x_s^{-1}(x))\mathrm{mod}(26)$ where J(y) denotes the largest integer that is less than or equal to y.

The utilized frequency information collecting unit 11 completes the collection of the information regarding the frequency to be used by this radio communication unit 12 when F(t) is maintained at the granularity of p.

Note that the above description is directed to the case of the frequency hopping scheme of the IEEE 802.11 or similar schemes, but even in the radio communication scheme with the detailed specification different from these, the frequency can be predicted once the hopping rule and the hopping rate are determined.

(Spectrum Direct Spreading of IEEE 802.11)

Next, the collection procedure in the case of the spectrum direct spreading scheme of the IEEE 802.11 or similar schemes will be described.

Figure 6:
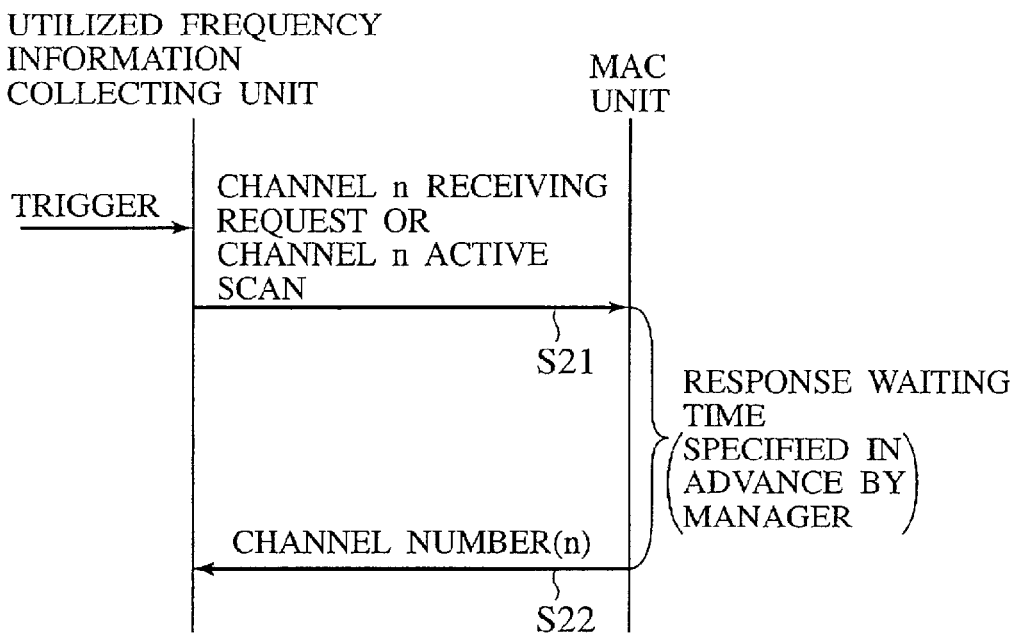
FIG. 6 is a sequence chart showing another exemplary collection sequence of the radio communication device of FIG. 1.

FIG. 6 shows an exemplary collection sequence in this case.

The utilized frequency information collecting unit 11 requests the MAC unit 124 of the radio communication unit 12 to receive a beacon frame or an arbitrary frame transmitted by the radio communication unit 12 of the surrounding radio communication device, sequentially with respect to all the frequencies that can be used by this radio communication scheme (ranging from channel 1 to channel 14 in Japan) (step S21). Here, the manner of requesting can be dependent on the implementation of the MAC unit 124. Alternatively, it is also possible to carry out the active scanning for urging the transmission of the beacon frame.

When the beacon frame or the arbitrary frame is received, the MAC unit 124 gives the channel number at a time of receiving the frame to the utilized frequency information collecting unit 11 along with the MAC address (step S22). Alternatively, the MAC unit 124 measures the radio signal intensity of that frequency and gives that channel number and the MAC address to the utilized frequency information collecting unit 11 when the measured radio signal intensity exceeds that for activating the CSMA/CA function used by the spectrum direct spreading scheme of the IEEE 802.11 or similar schemes.

Denoting the channel number received by the utilized frequency information collecting unit 11 as ch, the utilized frequency information collecting unit 11 completes the collection of the information regarding the frequency to be used by this radio communication unit 12 by interpreting that the frequencies between $F_{top}$ and $F_{bottom}$ given by:

$F_{top}=5 \cdot ch+2418 (1 \geq ch \geq 13)$ $F_{top}=2494 (ch=14)$ $F_{bottom}=5 \cdot ch+2396 (1 \geq ch \geq 13)$ $F_{bottom}=2743 (ch=14)$ are being used regardless of the time.

(Bluetooth)

Next, the collection procedure in the case of the Bluetooth will be described.

Figure 7:
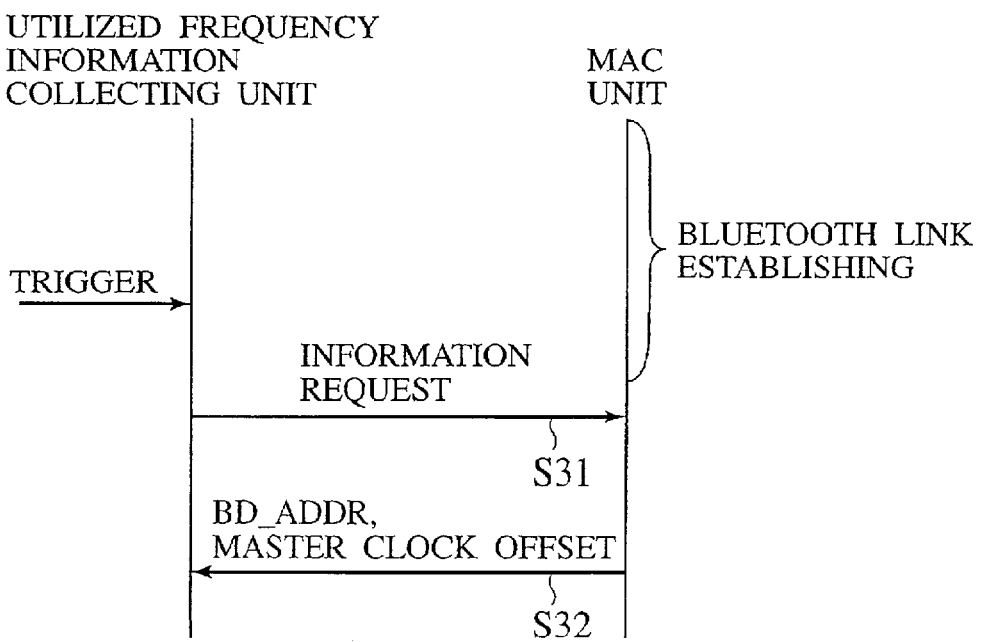
FIG. 7 is a sequence chart showing still another exemplary collection sequence of the radio communication device of FIG. 1.

FIG. 7 shows an exemplary collection sequence in this case.

In the Bluetooth, the baseband link establishing procedure is carried out in advance, and the utilized frequency information collecting unit 11 requests the information to the MAC unit 124 (step S31), and acquires the master clock offset and the master Bluetooth address (BD_ADDR) from the MAC unit 124 (step S32).

As described in the chapter 11 of the Bluetooth specification (Bluetooth Specification Version 1.0B), the Bluetooth uses the frequency hopping scheme in which the hopping sequence f (addr, clk) is determined from the master BD_ADDR and the master clock offset. Denoting the master BD_ADDR as addr and the master clock offset as clk, the frequency to be used F(t) MHz at the time t can be predicted by the following equations.

$F(t)=f(\mathrm{addr}, \mathrm{clk})+2402$ $\mathrm{addr}=BD\_ADDR$ $\mathrm{clk}=CLK+t/(312.5\ \mu sec)$ Note that the details of f(addr, clk) are disclosed in the chapter 11 of the Bluetooth specification (Bluetooth Specification Version 1.0B) so that their description will be omitted here.

The utilized frequency information collecting unit 11 completes the collection of the information regarding the frequency to be used by this radio communication unit 12 when F(t) is maintained at the granularity of 625 μsec which is the hopping rate.

Figure 8:
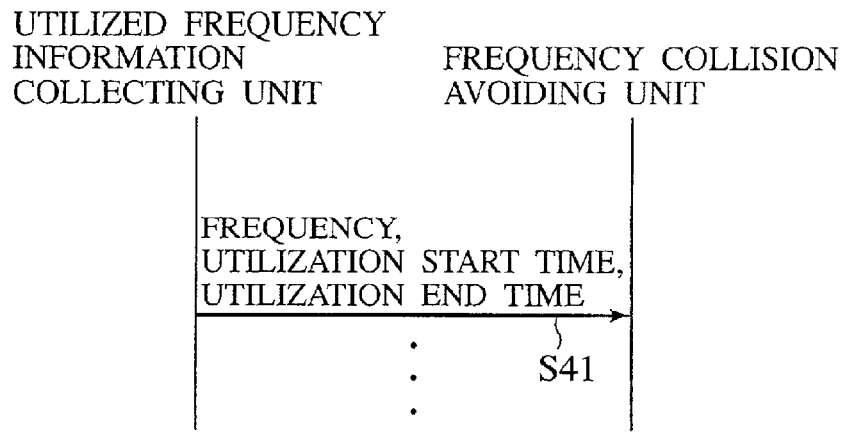
FIG. 8 is a sequence chart showing one exemplary registration sequence of the radio communication device of FIG. 1.

Now, as shown in an exemplary sequence of FIG. 8, the information regarding the frequency to be used by the radio communication unit 12 of the surrounding radio communication device collected by the procedures described above is stored at the utilized frequency information collecting unit 11 along with the MAC address or the Bluetooth address (BD_ADDR) (both of which will be referred to as a utilized frequency identifier hereafter) of the corresponding radio communication unit 12, and registered into the frequency collision avoiding unit 121 from the utilized frequency information collecting unit 11 (step S41). However, the information attached with the MAC address indicating this radio communication unit 12 itself will not be registered in this radio communication unit 12 itself.

Next, the collection procedure not dependent on the radio communication scheme to be used by the radio communication unit 12 will be described.

As the collection procedure for the information regarding the frequency to be used by the surrounding radio communication unit 12 that is not dependent on the radio communication scheme, there is a method for providing the input from the external by a manager or the like, for example. The entered frequency, time of use information and utilized frequency identifier are stored at the utilized frequency information collecting unit 11 and registered into the frequency collision avoiding unit 121.

On the other hand, the information regarding the frequency to be used by the surrounding radio communication device that has been collected or entered for this radio communication device 1 so far may be attached with a flag indicating that it is collected by this radio communication device 1 itself. It is also possible to attach a numerical value indicating the validity level of the collected information regarding the frequency to be used by the surrounding radio communication device. The numerical value indicating the validity level can be determined according to the level of the radio signal intensity at a time of collecting the information regarding the frequency to be used by the surrounding radio communication device, or determined according to criteria given from the external by the manager or the like, or set as a fixed value, for example.

Next, the radio communication unit 12 establishes the radio communication connection according to the specification of each radio communication scheme. For example, in the case of the radio communication unit using the IEEE 802.11, this is done by Association. It is also possible to carry out the exchange of the information regarding the frequency to be used by the surrounding radio communication device that is stored at the utilized frequency information collecting unit 11, with the correspondent radio communication device by utilizing the established radio communication connection. It is also possible to carry out the exchange of the information on the frequency to be used on a wired communication connection or another radio communication connection different from the established radio communication connection.

The exchange of the information regarding the frequency to be used by the surrounding radio communication device can be carried out by the following procedure, for example.

The exchange is carried out according to the flag or the numerical value indicating the validity level that is attached to the information regarding the frequency to be used by each surrounding radio communication device, as follows.

First, when the flag is attached or it is valid, i.e., the validity level is not invalid (0 for example), this information on the frequency to be used, the utilized frequency identifier, and the validity level are transmitted to the correspondent radio communication device. When this information on the frequency to be used, the utilized frequency identifier and the validity level are received, the utilized frequency information collecting unit 11 of the correspondent radio communication device stores them by setting the attached flag OFF or lowering the validity level. At a time of the storing, if there is one that coincides with the already stored utilized frequency identifier, the validity level of the received information and the validity level of the stored information are compared, and one with the higher validity level is stored. The stored information is registered into the frequency collision avoiding unit 121.

This exchange may be carried out at arbitrary timings, for an arbitrary number of times, after the collection of the information regarding the frequency to be used by the surrounding radio communication device is completed.

The information regarding the frequency to be used by the surrounding radio communication device obtained by this exchange can be treated equally as that collected by the own device, and can be re-distributed. In the re-distribution, the information regarding the frequency to be used by the surrounding radio communication device will be narrowed down by the above described procedure using the validity level.

Next, the avoidance of the radio wave interference in the data transmission/reception by the radio communication device according to the collected information regarding the frequency to be used by the surrounding radio communication device will be described.

Here, as described above, the frequency collision avoiding unit 121 collects the frequency to be used by this radio communication unit 12 itself and makes the prediction according to the collected information, by taking out the information on the timestamp, the hopping rate, the hopping set, the hopping pattern and the hopping index in the case of the frequency hopping scheme of the IEEE 802.11, the information on the channel to be used in the case of the spectrum direct spreading scheme of the IEEE 802.11, or the information on the master clock offset and the master Bluetooth address BD_ADDR in the case of the Bluetooth, from the MAC unit 124 of the radio communication unit 12 of the own device, similarly as in the case of making the prediction by collecting the information regarding the frequency to be used by the radio communication unit 12 of the surrounding radio communication device. It is assumed that the frequency collision avoiding unit 121 registers the information regarding the own device and the information regarding the surrounding device.

Next, the time of the collision between the frequency to be used by the radio communication unit of the surrounding radio communication device and the frequency to be used by the radio communication unit of the own device is determined.

The frequency collision avoiding unit 121 carries out the collision avoidance control when it becomes the time shortly before the collision occurs. The collision avoidance control is different depending on the radio communication scheme of the radio communication unit 12 of the own radio communication device and the radio communication scheme of the radio communication unit 12 of the colliding partner radio communication device.

(Case where Both Sides Use the Spectrum Direct) Spreading Scheme of the IEEE 802.11

First, in the case where both the radio communication unit 12 of the own radio communication device and the radio communication unit 12 of the colliding partner radio communication device use the spectrum direct spreading scheme of the IEEE 802.11, the frequency collision occurs continuously regardless of the time. For this reason, it is possible to improve the interference tolerance by commanding the transmission at the low transfer rate to the MAC unit 124. More specifically, by reducing the spreading code from 6 bits to 2 bits, and further by changing the modulation scheme from DQPSK to DBPSK, the interference tolerance can be improved. The command from the external of the MAC can be realized by setting registers to lower the transmission rate from 11 Mbps to 5.5 Mbps, 2 Mbps, and 1 Mbps. On the other hand, when the own radio communication unit 12 is providing BSS, it is possible to avoid the radio wave interference by selecting the non-colliding frequency by changing the channel used by the own radio communication unit 12.

(Case where At Least One Side Uses Scheme other than the Spectrum Direct Spreading Scheme of the IEEE 802.11

Next, in the case where either one or both of the radio communication unit 12 of the own radio communication device and the radio communication unit 12 of the colliding partner radio communication device use the scheme other than the spectrum direct spreading scheme of the IEEE 802.11, the frequency collision can be avoided by carrying out one or more of the following procedures.

Figure 9:
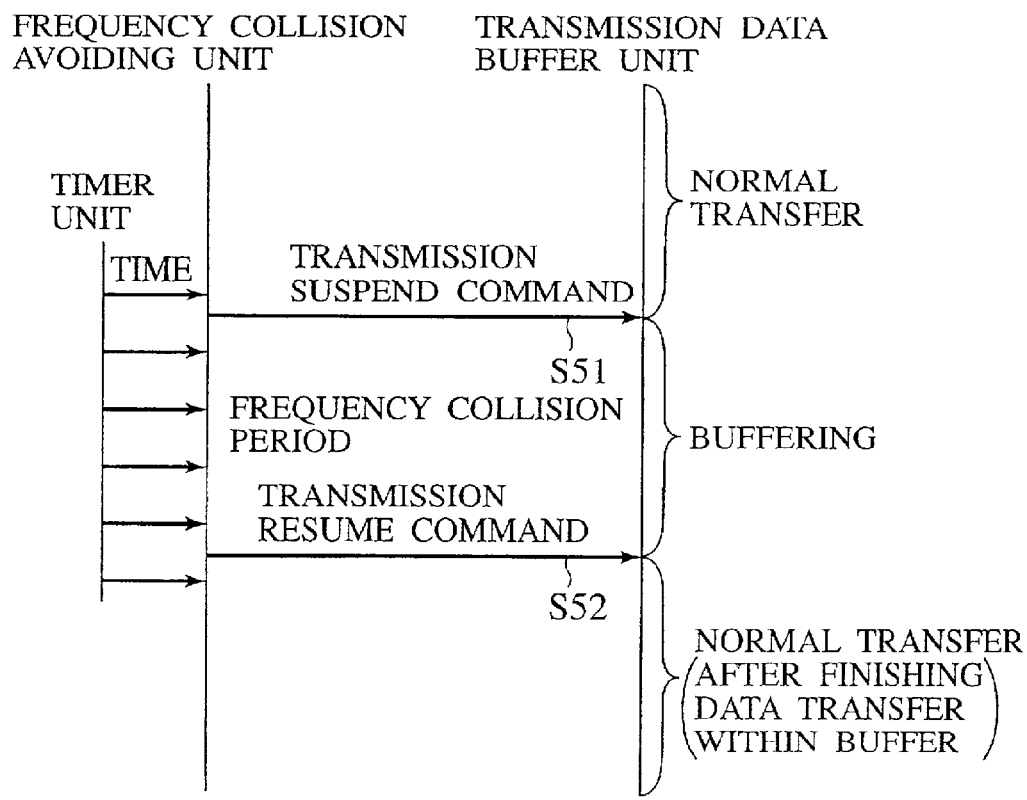
FIG. 9 is a sequence chart showing one exemplary frequency collision avoiding sequence of the radio communication device of FIG. 1.

(1) In the first procedure, as shown in an exemplary sequence of FIG. 9, the transmission data flowing into the MAC unit 124 are dammed at the transmission data buffer unit 123 during the collision period. Normally, the transmission data buffer unit 123 continually transfers the transmission data entered from the external, to the MAC unit 124 as the transmission data. On the other hand, when the frequency collision avoiding unit 121 sends a transmission suspend command to the transmission data buffer unit 123 at the beginning of the period for which the frequency collision is predicted according to the time information from the timer unit 122 (step S51), the transmission data buffer unit 123 temporarily suspends the transfer of the transmission data entered from the external, to the MAC unit 124. During this period, the transmission data entered from the external can be discarded, or buffered inside the transmission data buffer unit 123.

Figure 10:
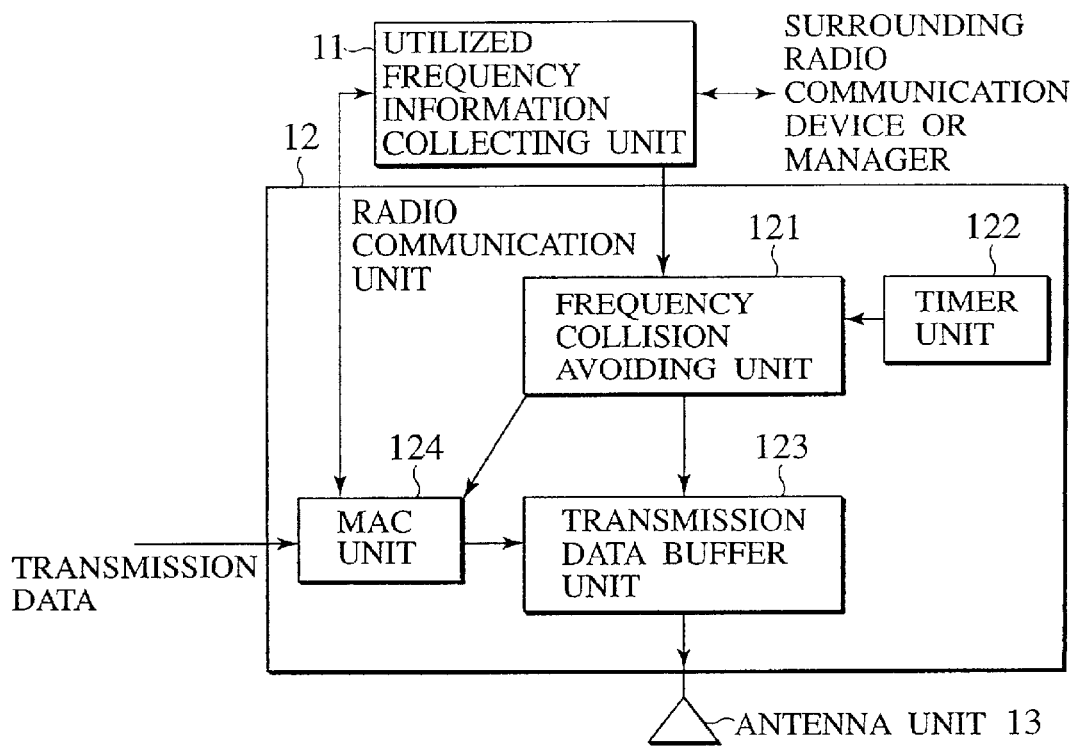
FIG. 10 is a block diagram showing another exemplary configuration of a radio communication unit in the radio communication device of FIG. 1.

Then, when the period for which the frequency collision is predicted is over, the frequency collision avoiding unit 121 sends a transmission resume command to the transmission data buffer unit 123 (step S52). According to this transmission resume command, the transmission data buffer unit 123 transfers any transmission data that are buffered inside the transmission data buffer unit 123 to the MAC unit 124, and the normal procedure for continually transferring the transmission data entered from the external, to the MAC unit 124 as the transmission data is resumed. Note that, as shown in FIG. 10, the transmission data buffer unit 123 may be arranged between the MAC unit 124 and the antenna 13.

Figure 11:
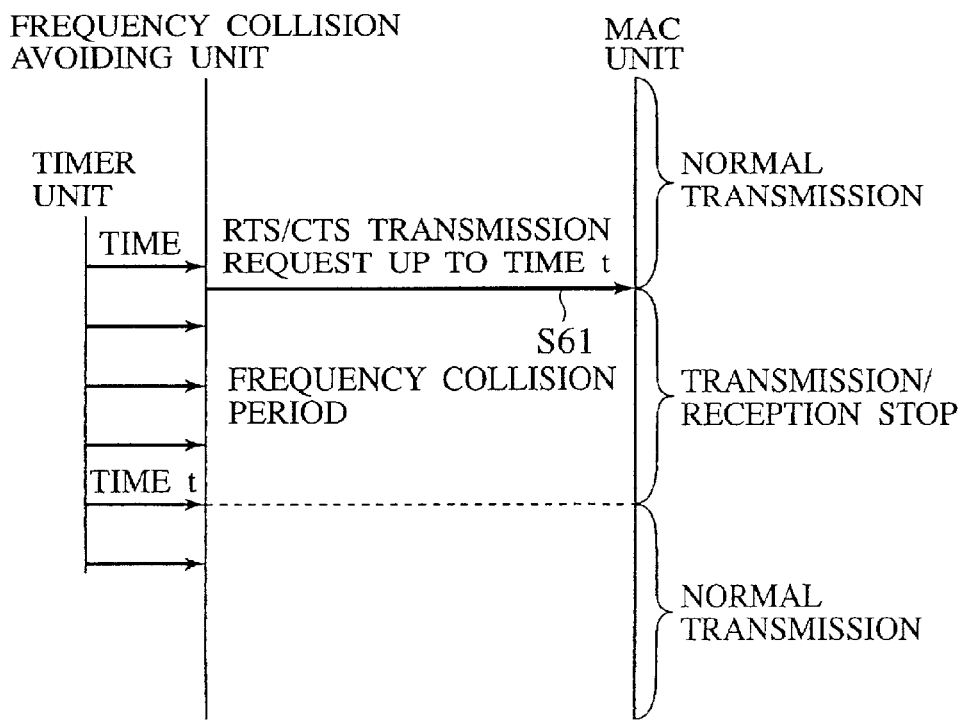
FIG. 11 is a sequence chart showing another exemplary frequency collision avoiding sequence of the radio communication device of FIG. 1.

(2) In the second procedure, as shown in an exemplary sequence of FIG. 11, an RTS frame or a CTS frame is transmitted to the radio communication unit 12 of the surrounding radio communication device before the collision period (step S61). When the RTS frame or the CTS frame is utilized, it is possible to indicate the time for which the radio communication connection is occupied by the radio communication unit 12 of the source radio communication device to the radio communication unit 12 of the surrounding radio communication device. Consequently, by indicating the occupied time that covers the collision period, it is possible to avoid the frequency collision due to the radio communication unit 12 of the surrounding radio communication device.

More specifically, the frequency collision avoiding unit 121 commands (requests) the MAC unit 124 to transmit the RTS frame or the CTS frame indicating the occupied time that covers the collision period, at the beginning of the time for which the frequency collision is predicted according to the time information from the timer unit 122. Note that the destination of the RTS frame and the CTS frame can be set as the own device, for example, but it is also possible to use the other setting.

(3) In the third procedure, the radio wave interference tolerance is improved by commanding the transmission at the lower transfer rate in the case of the IEEE 802.11, or by commanding the transmission by the scheme with a higher FEC value in the case of the Bluetooth.

The case of the spectrum direct spreading scheme of the IEEE 802.11 is the same as described above.

Figure 12:
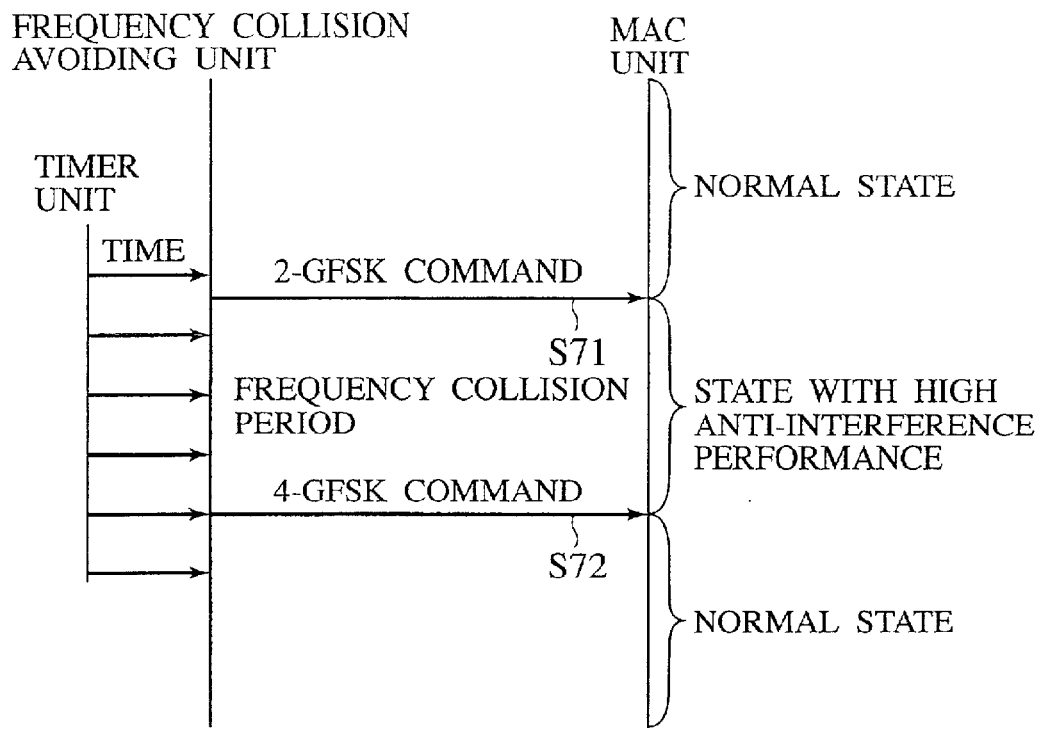
FIG. 12 is a sequence chart showing still another exemplary frequency collision avoiding sequence of the radio communication device of FIG. 1.

In the case of the frequency hopping scheme of the IEEE 802.11, as shown in an exemplary sequence of FIG. 12, the interference tolerance is improved by changing the modulation scheme temporarily from 4-GFSK to 2-GFSK (as the frequency collision avoiding unit 121 issues respective commands to the MAC unit 124) (steps S71 and S72). The commands from the external of the MAC can be realized by setting registers to lower the transmission rate from 2 Mbps to 1 Mbps.

In the case of the Bluetooth, the interference tolerance is improved by switching from no FEC setting to ⅔ FEC setting. The command from the external of the MAC can change link channels using the packet types of DH1, DH3 and DH5 to link channels using the packet types of DM1, DM3 and DM5.

In the following, the method in which the radio communication unit 12 has a plurality of antennas 13, and the radio wave interference is avoided by identifying the antenna, in addition to the above described procedures, will be described.

Each antenna 13 is assigned with an antenna identifier. The MAC unit 124 may be compatible with the implementation using a plurality of antennas 13 (the MAC unit 124 has a function for controlling the antenna to be used) or may not be compatible. In the following, each case will be described separately.

First, the case in which the MAC unit 124 is capable of handling the antenna identifier will be described.

Figure 13:
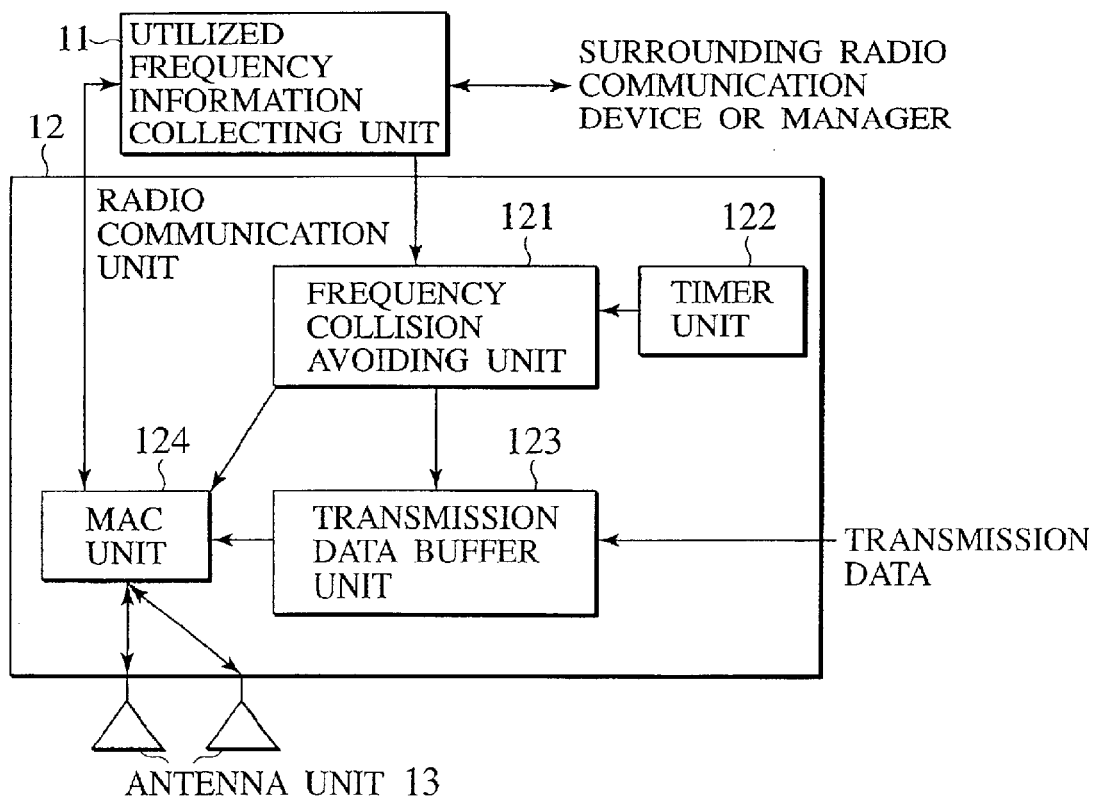
FIG. 13 is a block diagram showing still another exemplary configuration of a radio communication unit in the radio communication device of FIG. 1.

FIG. 13 shows an exemplary configuration of the radio communication device in this case.

The above described procedure for collecting the information regarding the frequency to be used by the radio communication unit 12 of the surrounding radio communication device is started, and the frequency to be used by the surrounding radio communication device is predicted. Here, the exemplary case of using the frequency hopping scheme of the IEEE 802.11 or similar scheme will be described.

Figure 14:
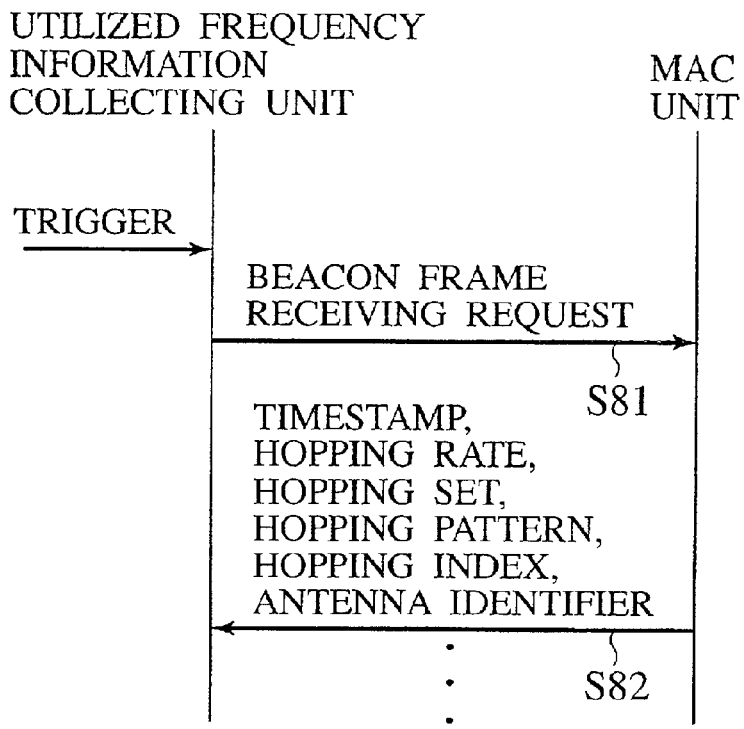
FIG. 14 is a sequence chart showing one exemplary collection sequence of the radio communication device of FIG. 13.
Figure 15:
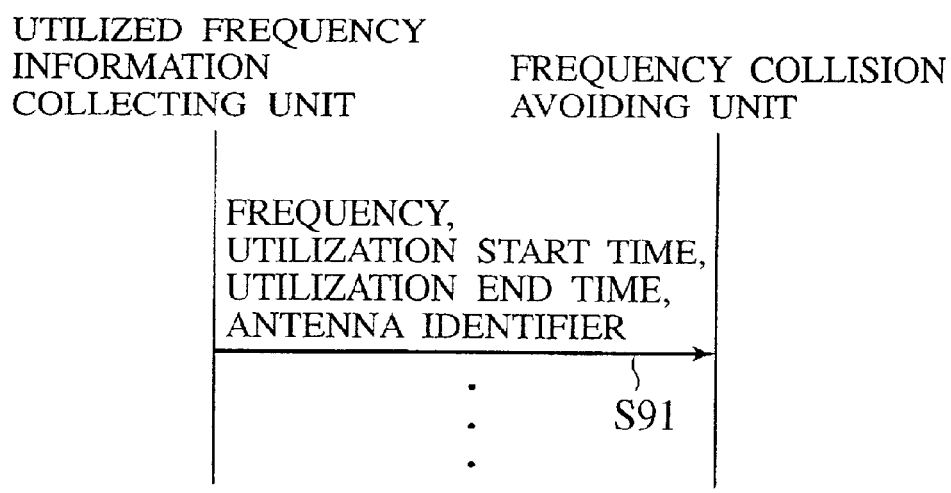
FIG. 15 is a sequence chart showing one exemplary registration sequence of the radio communication device of FIG. 13.

FIG. 14 shows an exemplary collection sequence in this case.

The utilized frequency information collecting unit 11 requests the MAC unit 124 of the radio communication unit 12 to receive the beacon frame transmitted by the radio communication unit 12 of the surrounding radio communication device (step S81). The method for requesting to be used here may be dependent on the implementation of the MAC unit 124.

When the beacon frame is received, the MAC unit 124 gives the antenna identifier of the antenna 13 by which this beacon frame is received, to the utilized frequency information collecting unit 11, along with the information on the timestamp, the hopping rate, the hopping set, the hopping pattern, and the hopping index described within the beacon frame (step S82).

The utilized frequency information collecting unit 11 stores the received antenna identifier in addition to the timestamp, the hopping rate, the hopping set, the hopping pattern, and the hopping index. Moreover, as shown in an exemplary sequence of FIG. 15, the utilized frequency information collecting unit 11 registers these informations into the frequency collision avoiding unit 121 (step S91).

The frequency collision avoiding unit 121 can predict the frequency to be used by the radio communication unit 12 that has sent the beacon frame by the method described above, and identify the antennas which causes the radio wave interference with this radio communication unit 12. The prediction of the frequency is similar to the method described above, and the antenna identifier related to that prediction information is added here. This prediction of the frequency to be used in which the antenna identifier is added can also be carried out by the method as described above for the other radio communication schemes.

Next, the case in which the MAC unit 124 is not capable of handling the antenna identifier will be described.

Figure 16:
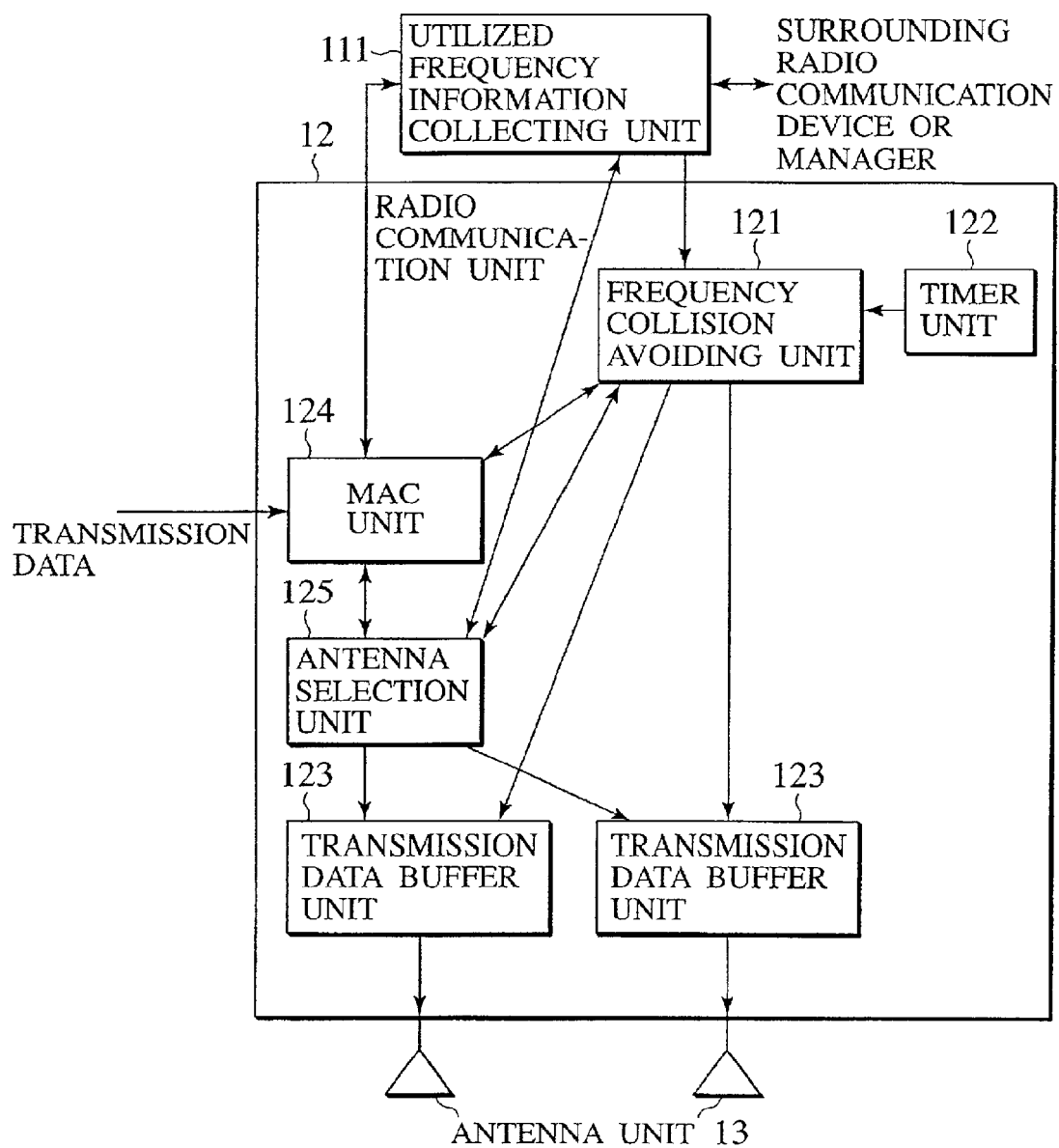
FIG. 16 is a block diagram showing still another exemplary configuration of a radio communication unit in the radio communication device of FIG. 1.

FIG. 16 shows an exemplary configuration of the radio communication device in this case.

Figure 17:
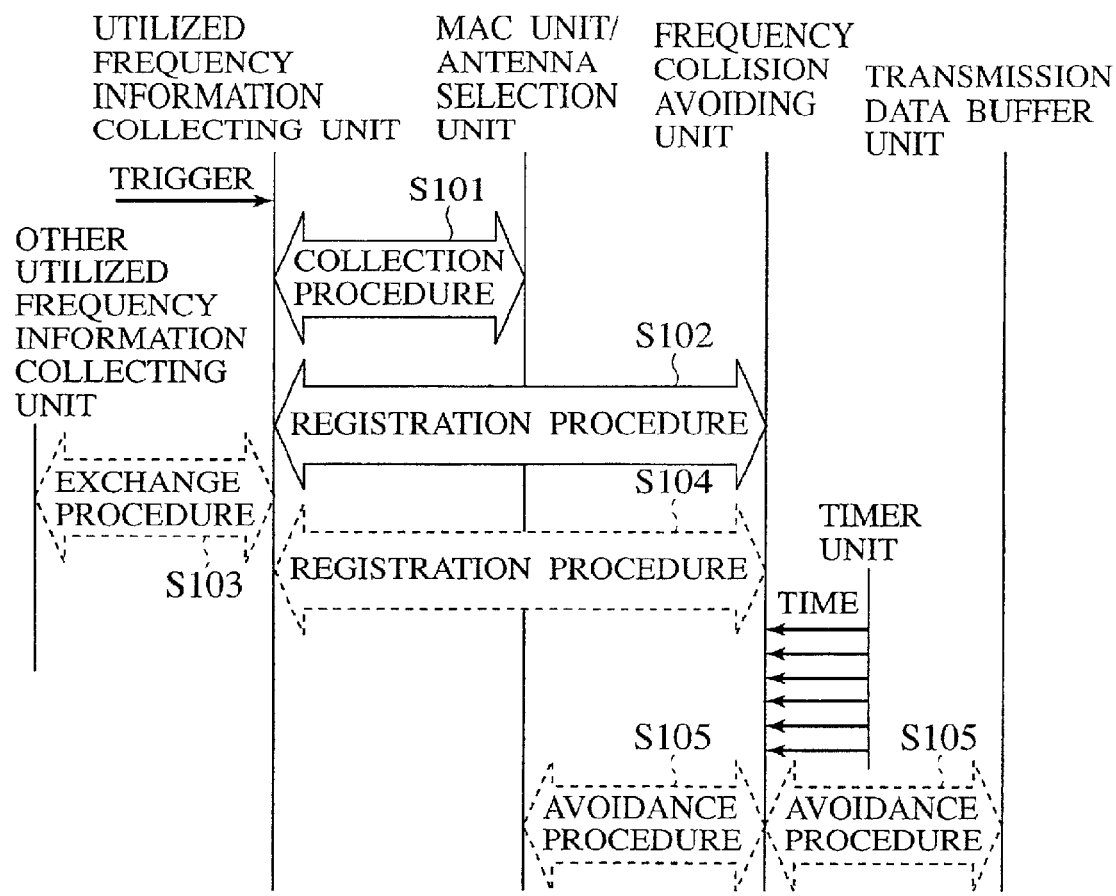
FIG. 17 is a sequence chart showing one exemplary processing sequence of the radio communication device of FIG. 16.

FIG. 17 shows an exemplary processing sequence of the radio communication device in this case.

In this case, the utilized frequency information collecting unit 11 specifies an antenna identifier to be used to an antenna selection unit 125, so as to operate the antenna 13 to be used by the MAC unit 124 independently from the MAC unit 124.

Figure 18:
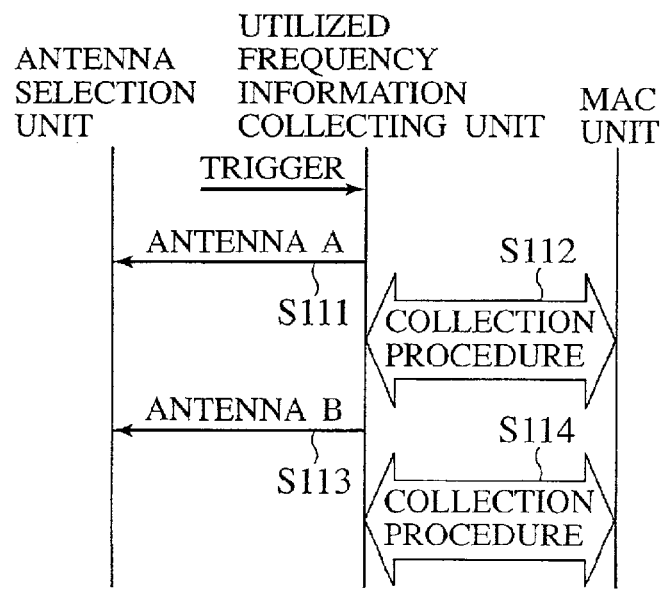
FIG. 18 is a sequence chart showing one exemplary collection sequence of the radio communication device of FIG. 16.

As for the above described procedure for collecting the information regarding the frequency to be used by the surrounding radio communication device, when two antennas A and B are connected, as shown in an exemplary sequence of FIG. 18, the procedure for collecting the information regarding the frequency to be used by the surrounding radio communication device is carried out with respect to each one of the antennas A and B (steps S111 and S113), and each collected information is stored by attaching the corresponding one of the antenna identifiers A and B. In addition, as shown in an exemplary sequence of FIG. 15, the collected information is registered into the frequency collision avoiding unit 121 (step S91).

In this way, the frequency collision in units of time in correspondence to the antennas can be predicted. Thereafter, similarly as in the case of not using the antenna identification, the radio communication connection can be established, the validity level can be attached to each prediction, and the exchange of the information regarding the frequency to be used by the surrounding radio communication device with the correspondent radio communication device can be carried out.

In this case, when the information is to be exchanged by using the antenna different from the antenna used in collecting the information, as in the case where the antenna identifier attached to the frequency collision prediction information is A and the antenna identifier of the antenna to be used for the exchange is B, the exchange by adjusting (increasing or decreasing) the validity level of that frequency collision information can be effective. The level of the adjustment depends on the arrangement and the orientations of the antennas, and it is set up in the utilized frequency information collecting unit 11 by the manager in advance. The exchanged information is registered into the frequency collision avoiding unit 121.

By the information collection, exchange and registration described above, the frequency collision avoiding unit 121 predicts the frequency collision, and carries out the avoidance of the frequency collision by the following procedure. This collision avoidance will also be described for the case where the MAC unit 124 is compatible with the plurality of antennas 13 and the case where the MAC unit 124 is not compatible with the plurality of antennas 13 separately.

First, the case in which the MAC unit 124 is capable of handling the antenna identifier will be described.

Figure 19:
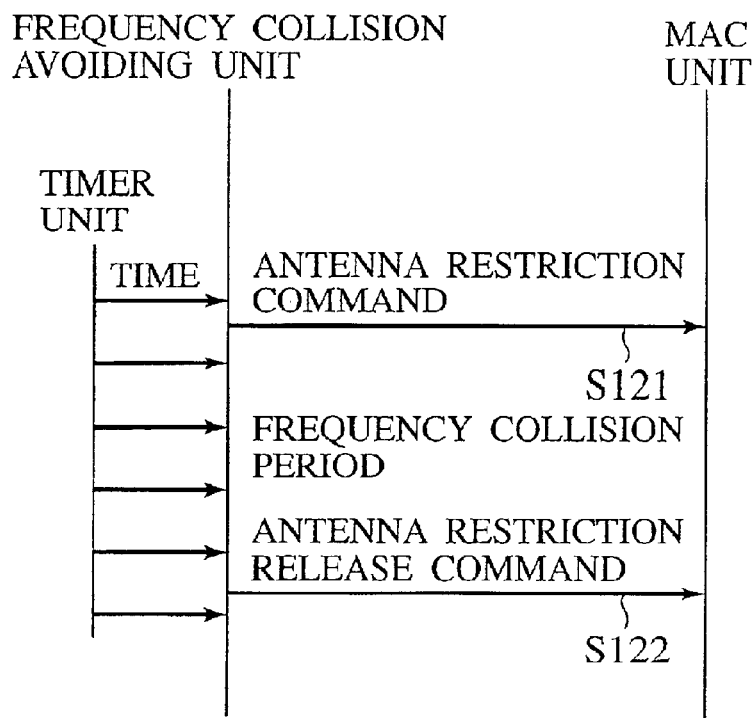
FIG. 19 is a sequence chart showing one exemplary frequency collision avoiding sequence of the radio communication device of FIG. 16.

FIG. 19 shows an exemplary processing sequence in this case.

Normally, the transmission data buffer unit 123 continually transfers the transmission data entered from the external, to the MAC unit 124 as the transmission data. When it becomes the time for which the frequency collision is predicted for a specific antenna 13 according to the time information from the timer unit 122, the frequency collision avoiding unit 121 sends a command (an antenna restriction command) for not using that antenna 13 to the MAC unit 124 (step S121), and thereafter, when the period for which the frequency collision is predicted is over, the frequency collision avoiding unit 121 sends a command (an antenna restriction release command) for resuming the use of that antenna 13 to the MAC unit 124 (step S122).

On the other hand, when it becomes the period for which the frequency collision is predicted for all the antennas 13 related to some MAC unit 124 according to the time information from the timer unit 122, as shown in an exemplary sequence of FIG. 9, similarly as in the case of not using plural antennas, the frequency collision avoiding unit 121 sends a transmission suspend command to the transmission data buffer unit 123 at the beginning of the period for which the frequency collision is predicted, and the transmission data buffer unit 123 temporarily suspends the transfer of the transmission data entered from the external, to the MAC unit 124 (step S51). During this period, the transmission data entered from the external can be discarded, or buffered inside the transmission data buffer unit 123.

Then, when the period for which the frequency collision is predicted is over, the frequency collision avoiding unit 121 sends a transmission resume command to the transmission data buffer unit 123 (step S52). According to this transmission resume command, the transmission data buffer unit 123 transfers any transmission data that are buffered inside the transmission data buffer unit 123 to the MAC unit 124, and the normal procedure for continually transferring the transmission data entered from the external, to the MAC unit 124 as the transmission data is resumed.

Next, the case in which the MAC unit 124 is not capable of handling the antenna identifier will be described.

In this case, the transmission data buffer unit 123 is arranged between the antenna selection unit 125 and the antenna 13.

When it becomes the period for which the frequency collision is predicted for some antenna according to the time information from the timer unit 122, the frequency collision avoiding unit 121 avoids the frequency collision by the following methods.

Figure 20:
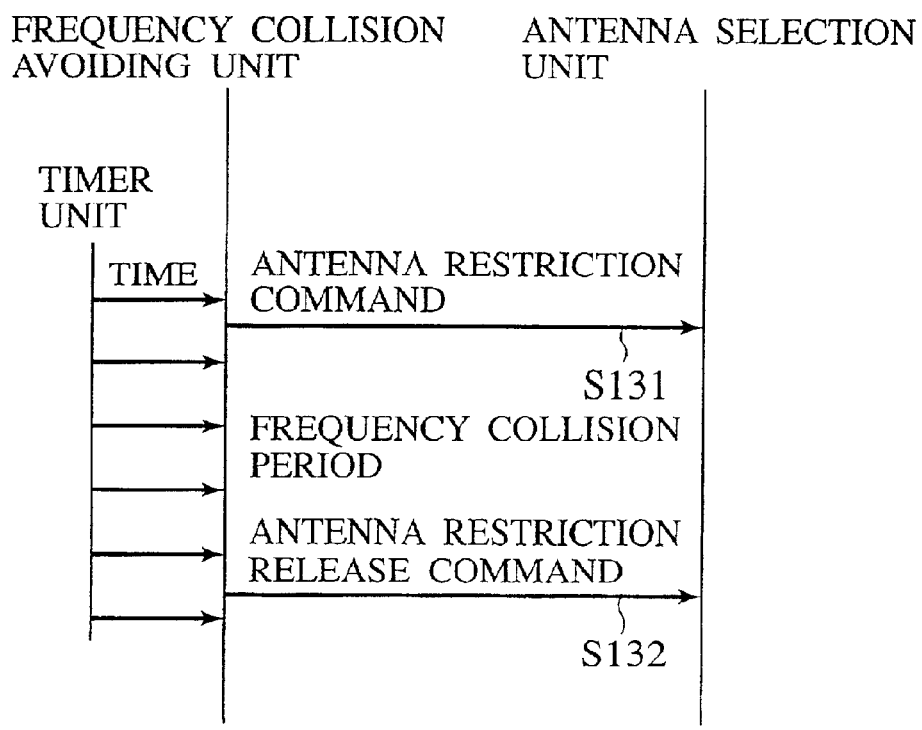
FIG. 20 is a sequence chart showing another exemplary frequency collision avoiding sequence of the radio communication device of FIG. 16.

(1) In one method, as shown in an exemplary sequence of FIG. 20, the frequency collision avoiding unit 121 sends commands (antenna restriction command, antenna restriction release command) for using antennas other than the antenna for which the frequency collision is predicted during the period for which the frequency collision is predicted (steps S131 and S132).

Figure 21:
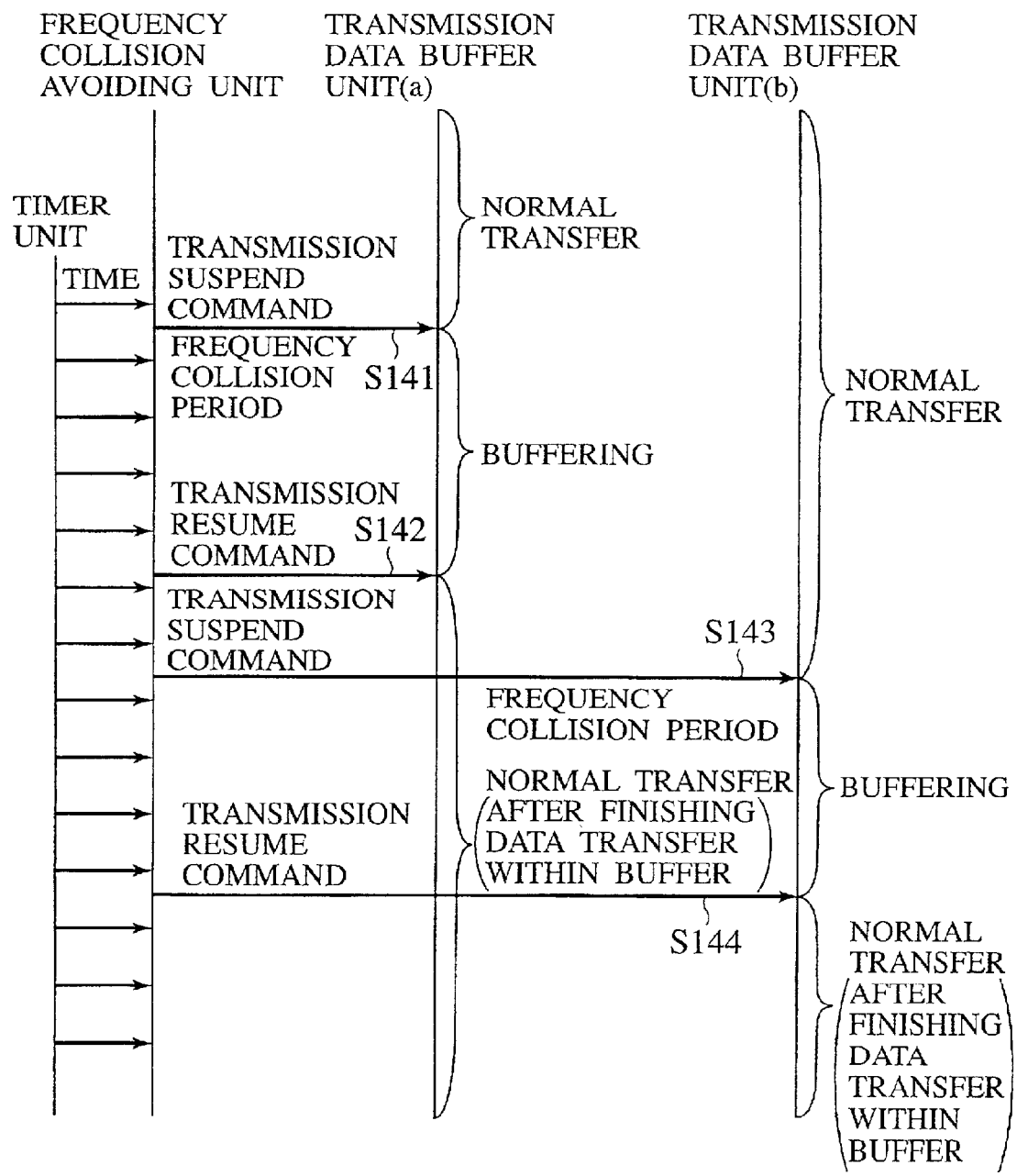
FIG. 21 is a sequence chart showing still another exemplary frequency collision avoiding sequence of the radio communication device of FIG. 16.

(2) In another method, as shown in an exemplary sequence of FIG. 21, the frequency collision avoiding unit 121 sends a transmission suspend command to the transmission data buffer unit 123 corresponding to that antenna at the beginning of the period for which the frequency collision is predicted, and this transmission data buffer unit 123 temporarily suspends the transfer of the transmission data entered from the antenna selection unit 125, to the antenna 13 (step S141). During this period, the transmission data entered from the external can be discarded, or buffered inside the transmission data buffer unit 123.

Then, when the period for which the frequency collision is predicted is over, the frequency collision avoiding unit 121 sends a transmission resume command to this transmission data buffer unit 123 (step S142). According to this transmission resume command, this transmission data buffer unit 123 transfers any transmission data that are buffered inside this transmission data buffer unit 123 to the antenna 13, and the normal procedure for continually transferring the transmission data entered from the antenna selection unit 125, to the antenna 13 as the transmission data is resumed.

As described above, in the present invention, under the environment in which the radio communication devices of various schemes using the same frequency band are coexisting, the prediction information for at least one of a frequency to be used, a time, and a direction for the surrounding radio communication device from the frame transmitted by the surrounding radio communication device or the input from the external. Then, using this information and the prediction information for at least one of a frequency to be used, a time, and a direction for the own radio communication device, a frequency, a time or a direction for which the occurrence of interferences for the radio communication is predicted is obtained, and the control to carry out the radio communications by avoiding that frequency, time or direction.

For example, it is possible to prevent the degradation of the communication rate performance due to the radio wave interference by the method such as the postponing of the data transmission, the shortening of the transmission frame, the interruption of the data transmission/reception, the use of the modulation with a superior radio wave interference tolerance, the selection of the transmission/reception direction, the avoidance of the use of the colliding frequency, etc.

According to the present invention, under the environment in which the radio communication devices of various schemes using the same frequency band are coexisting, each radio device recognizes the scheme of the other radio device, and the control for coordinating the different radio communication schemes is applied, so that it is possible to prevent the unnecessary degradation of the communication rate performance due to the radio wave interference and maintain the fairness in the communication performance among different radio communication schemes, without requiring any change to the specification of the radio device itself.

Thus, according to the present invention, it becomes possible to prevent the unnecessary degradation of the communication rate performance and maintain the fairness in the communication performance among different radio communication schemes even under the environment in which radio communication devices of various schemes using the same frequency band are coexisting.

Note that each functional block described above can be combined with the control tuned to the surrounding environment by implementing it as software on a rewritable memory (such as EEPROM) or as interchangeable hardware. Here, the tuning may include the addition of the further necessary function, the change to the function suitable for the operating environment, the deletion of the unnecessary function, etc., for example.

Note also that each function described above can be realized either as hardware (such as semiconductor element) or as software.

It is to be noted that the above described embodiment according to the present invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art.

In particular, the radio communication device of the above described embodiment can be conveniently implemented in a form of a software package.

Such a software package can be a computer program product which employs a storage medium including stored computer code which is used to program a computer to perform the disclosed function and process of the present invention. The storage medium may include, but is not limited to, any type of conventional floppy disks, optical disks, CD-ROMs, magneto-optical disks, ROMs, RAMs, EPROMs, EEPROMs, magnetic or optical cards, or any other suitable media for storing electronic instructions.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A radio communication device, comprising:

a radio communication unit configured to carry out radio communications by a first radio control scheme;

an acquisition unit configured to acquire a prediction information for at least one of a frequency, a time and a direction to be used by each one of the first radio control scheme of the radio communication device and a second radio control scheme of another radio communication device located within a communication possible range of the radio communication device; and a collision avoiding unit configured to obtain a predicted frequency, a predicted time or a predicted direction for which interferences between radio communications by the first radio control scheme and radio communications by the second radio control scheme are predicted to occur according to the prediction information, and control the radio communication unit to carry out radio communications by avoiding the predicted frequency, the predicted time or the predicted direction, wherein the radio communication unit is also configured to exchange the predicted information for the first radio control scheme acquired by the radio communication device, with the another radio communication device.

2. A radio communication device, comprising:

a radio communication unit configured to carry out radio communications by a first radio control scheme;

an acquisition unit configured to acquire a prediction information for at least one of a frequency, a time and a direction to be used by each one of the first radio control scheme of the radio communication device and a second radio control scheme of another radio communication device located within a communication possible range of the radio communication device; and a collision avoiding unit configured to obtain a predicted frequency, a predicted time or a predicted direction for which interferences between radio communications by the first radio control scheme and radio communications by the second radio control scheme are predicted to occur according to the prediction information, and control the radio communication unit to carry out radio communications by avoiding the predicted frequency, the predicted time or the predicted direction, wherein the radio communication unit is also configured to exchange the prediction information for the second radio control scheme acquired by the another radio communication device, with the another radio communication device.

3. A radio communication device, comprising:

a radio communication unit configured to carry out radio communications by a first radio control scheme;

an acquisition unit configured to acquire a prediction information for at least one of a frequency, a time and a direction to be used by each one of the first radio control scheme of the radio communication device and a second radio control scheme of another radio communication device located within a communication possible range of the radio communication device; and a collision avoiding unit configured to obtain a predicted frequency, a predicted time or a predicted direction for which interferences between radio communications by the first radio control scheme and radio communications by the second radio control scheme are predicted to occur according to the prediction information, and control the radio communication unit to carry out radio communications by avoiding the predicted frequency, the predicted time or the predicted direction, wherein the collision avoiding unit controls the radio communication unit to shorten a frame length of frames to be transmitted by the radio communication unit.

4. A radio communication device, comprising:

a radio communication unit configured to carry out radio communications by a first radio control scheme;

an acquisition unit configured to acquire a prediction information for at least one of a frequency, a time and a direction to be used by each one of the first radio control scheme of the radio communication device and a second radio control scheme of another radio communication device located within a communication possible range of the radio communication device; and a collision avoiding unit configured to obtain a predicted frequency, a predicted time or a predicted direction for which interferences between radio communications by the first radio control scheme and radio communications by the second radio control scheme are predicted to occur according to the prediction information, and control the radio communication unit to carry out radio communications by avoiding the predicted frequency, the predicted time or the predicted direction, wherein the collision avoiding unit controls the radio communication unit to temporarily change a modulation scheme from a normally used modulation scheme to a modulation scheme with higher interference tolerance at the predicted time.

5. A radio communication control method for a radio communication device having a radio communication unit configured to carry out radio communications by a first radio control scheme, a plurality of antennas being attached to the radio communication unit, the method comprising:

acquiring a prediction information for a frequency, a time and a an antenna to be used by each one of the first radio control scheme of the radio communication device and a second radio control scheme of another radio communication device located within a communication possible range of the radio communication device;

obtaining a predicted frequency, a predicted time and a predicted antenna for which interferences between radio communications by the first radio control scheme and radio communications by the second radio control scheme are predicted to occur according to the prediction information; and controlling the radio communication unit to carry out radio communications by avoiding the predicted frequency, the predicted time and the predicted antenna.

6. A computer program product for causing a computer to function as a radio communication device having a radio communication unit configured to carry out radio communications by a first radio control scheme, a plurality of antennas being attached to the radio communication unit, the computer program product comprising:

a first computer program code for causing the computer to acquire a prediction information for a frequency, a time and an antenna to be used by each one of the first radio control scheme of the radio communication device and a second radio control scheme of another radio communication device located within a communication possible range of the radio communication device;

a second computer program code for causing the computer to obtain a predicted frequency, a predicted time and a predicted antenna for which interferences between radio communications by the first radio control scheme and radio communications by the second radio control scheme are predicted to occur according to the prediction information; and a third computer program code for causing the computer to control the radio communication unit to carry out radio communications by avoiding the predicted frequency, the predicted time and the predicted antenna.

7. A radio communication device, comprising:

a radio communication unit configured to carry out radio communications by a first radio control scheme;

a plurality of antennas attached to the radio communication unit;

an acquisition unit configured to acquire a prediction information for a frequency, a time and an antenna to be used by each one of the first radio control scheme of the radio communication device and a second radio control scheme of another radio communication device located within a communication possible range of the radio communication device; and a collision avoiding unit configured to obtain a predicted frequency, a predicted time and a predicted antenna for which interferences between radio communications by the first radio control scheme and radio communications by the second radio control scheme are predicted to occur according to the prediction information, and control the radio communication unit to carry out radio communications by avoiding the predicted frequency, the predicted time and the predicted antenna.

8. The radio communication device of claim 7, wherein the radio communication unit perceives which antenna is used for transmitting and receiving data, and the acquisition unit acquires the prediction information for the frequency and time and the prediction information for the antenna through which the prediction information for the frequency and time is received from the radio communication unit as a set.

9. The radio communication device of claim 7, further comprising an antenna selecting unit configured to select an antenna to be used among the plurality of antennas, wherein the acquisition unit gives the antenna selecting unit information for specifying each antenna and acquires the prediction information for the frequency and time for each antenna.

* * * * *